United States Patent [19]

Spingler

[11] 4,325,108
[45] Apr. 13, 1982

[54] RECHARGEABLE BATTERY UNIT FOR BICYCLE ILLUMINATION

[75] Inventor: Werner Spingler, Badenweiler, Fed. Rep. of Germany

[73] Assignee: ESGE-Marby GmbH & Co., Bielefeld, Fed. Rep. of Germany

[21] Appl. No.: 146,026

[22] Filed: May 2, 1980

[30] Foreign Application Priority Data

May 12, 1979 [DE] Fed. Rep. of Germany ....... 2919211

[51] Int. Cl.³ .............................................. F21V 33/00
[52] U.S. Cl. ..................................... 362/183; 362/72; 362/192; 362/193; 362/368
[58] Field of Search ............... 362/192, 193, 183, 368, 362/72

[56] References Cited

U.S. PATENT DOCUMENTS 3,792,307 2/1974 Baker ................................. 362/193

FOREIGN PATENT DOCUMENTS 1713478 12/1955 Fed. Rep. of Germany .
2729849 8/1978 Fed. Rep. of Germany .
7823245 12/1978 Fed. Rep. of Germany .
643615 9/1928 France .

Primary Examiner—Stephen J. Lechert, Jr.
Attorney, Agent, or Firm—Frishauf, Holtz, Goodman & Woodward

[57] ABSTRACT

To provide an easily removed and supervisable electrical battery unit for a bicycle, for selective connection to a bicycle generator, a unitary housing (1) retaining battery cells (4) is mounted on the handle bar support posts (17, 19) by rearwardly extending wing-like projections, through which a bolt (23, 28) is passed reaching around the rear of the post (17, 19) to releasably and firmly secure the housing to the bicycle. The top wall of the housing carries two monitoring lamps, one indicating the charge state of the battery and the other proper functioning of the illumination circuit and, especially, of the tail light of the bicycle. The battery unit, thus, with the monitoring light, is continuously within the field of vision of the bicycle rider. A solar cell can be secured to the top wall of the housing for recharging of the rechargeable batteries when the bicycle is operated in bright light; alternatively, the unit can be readily removed from the bicycle and contains its own power network recharging unit and cable to plug it into a power outlet.

16 Claims, 11 Drawing Figures

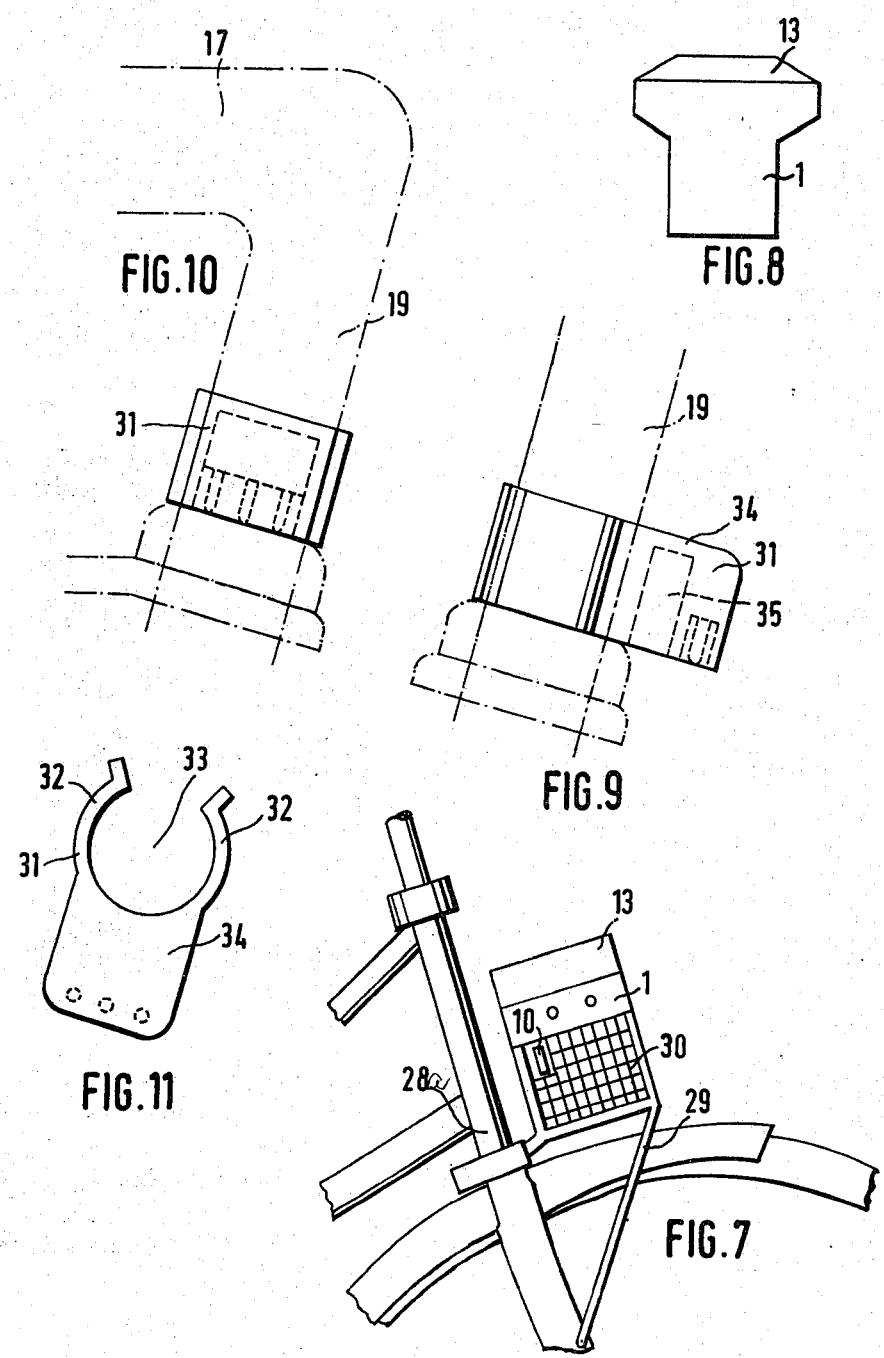

RECHARGEABLE BATTERY UNIT FOR BICYCLE ILLUMINATION

The present invention relates to a rechargeable battery unit for removable attachment to a bicycle, and electrical association with a generator mounted on the bicycle and operating when the bicycle is being operated, and including a transfer switch to permit energization of head lights and/or tail lights of the bicycle, selectively, from the battery or from the generator.

BACKGROUND AND PRIOR ART

Battery units including rechargeable batteries as previously constructed usually were self-contained units to which a transfer switch was electrically connected by wires and remotely located. Usually, the battery was held in a long tube, clipped to a frame portion of the bicycle, for example beneath the horizontal frame bar or alongside the saddle support post. The operator of the bicycle had no opportunity to monitor the charge state of the battery or the function of the lights energized thereby, and particularly to be assured that the tail light is operative.

THE INVENTION

It is an object to provide a battery unit which enables the operator of a bicycle to readily monitor the operation and charge state of the battery, the operation of the light system, and particularly of the tail light thereon, and to readily operate the transfer switch between the generator output and battery supply without substantial change of the guiding position of the hands of the operator on the handle bar of the bicycle.

Briefly, a unitary housing is provided which has means to releasably attach it to the frame of the bicycle in a predetermined position so that the housing will have a clearly defined top surface or top wall. Preferably, the attachment is by means of a releasable clamp bolt attaching the battery housing to the handle bar stem or handle bar post so that the battery unit will be located centrally of the bicycle, forwardly of the rider, and immediately visible at a glance, within the field of vision of the rider. The battery housing retains rechargeable batteries, and the transfer switch is located directly thereon, for example on a side wall, and externally accessible. Merely shifting one hand from the normal riding position towards the center permits operation of the transfer switch. Located to be visible by the operator, that is, in his direct field of vision and, for example, at or adjacent the top wall of the housing, are two indicators, one indicating the charge state of the battery, and the other indicator monitoring proper operation of the lighting system, and specifically of the tail light which is difficult to check by one person. The monitor lights provide indications of proper functioning of the respective light units.

The top wall of the housing may, additionally, be so constructed as to provide a holder for solar cells to recharge the rechargeable batteries, when the bicycle is operated in bright light.

Preferably, the housing also includes a recharging unit adapted for connection to a power outlet. The indicators, preferably, are two monitoring lamps or light emitting diodes (LEDs) located on the top wall of the housing.

Rather than mounting the housing on the handle bar stem or post, it is also possible to so construct the housing that it can be clipped to the handle bar or to a support frame constructed similarly to a front-wheel luggage carrier.

Common location of the battery and all accessories, together with the necessary electrical connections thereto, results in a single housing permitting simple handling for the user, immediate monitoring of proper operation without distracting from attention to traffic since the arrangement is located within the field of vision of the rider, so as to insure effortless supervision of proper light operation of the bicycle, that is, the charge state of the battery and operation of the tail light and/or the front head light as well.

DRAWINGS

FIG. 7 is a side view of the housing supported in part by a separate bracket and a cage;

FIG. 8 is a front view of the housing supported in accordance with FIG. 7;

FIG. 9 is a schematic side view of a connecting coupling to form a current connecting element or bridge between electrical equipment on a bicycle adapted to be connected to the battery unit, and after removal of the battery unit.

FIG. 10 is a side view of the coupling unit; and

FIG. 11 is a top view of the connecting or coupling unit.

Figure 2:
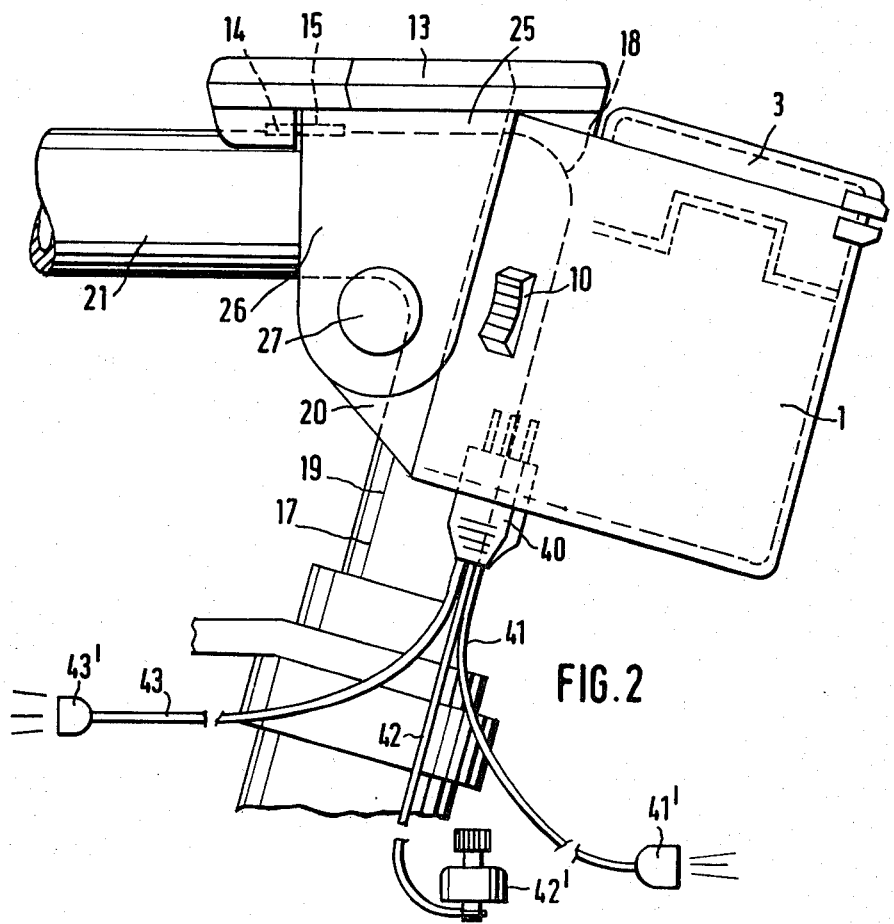
FIG. 2 is a side view of the housing shown, in part, assembled on the handle bar stem or post of a recessed handle bar support of the bicycle.
Figure 3:
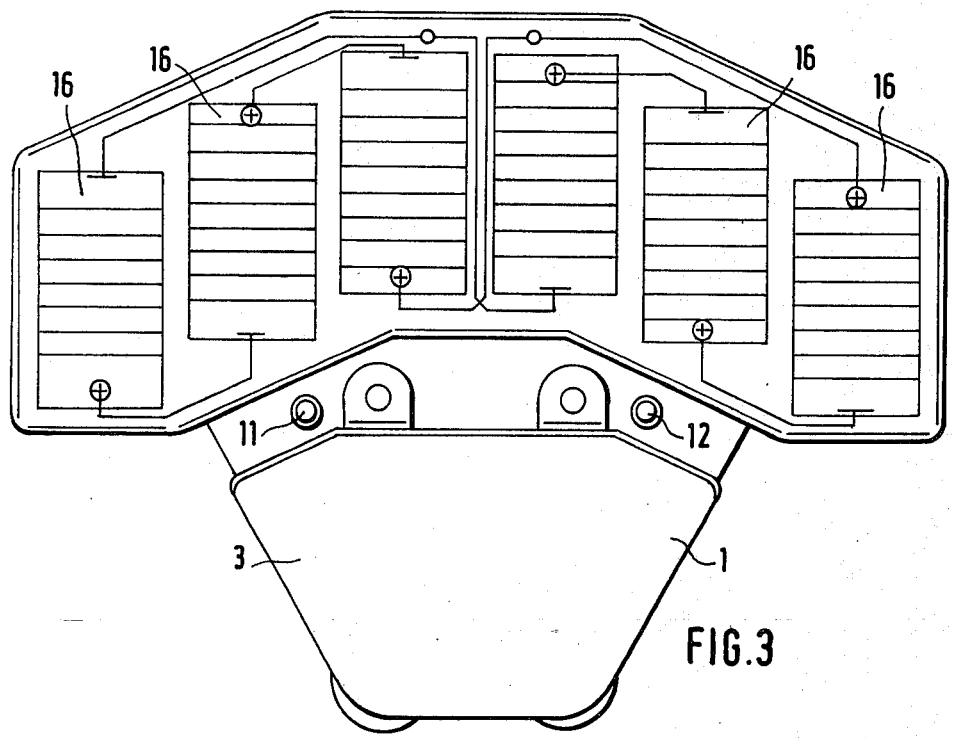
FIG. 3 is a top view of the housing and schematically showing solar cells.
Figure 4:
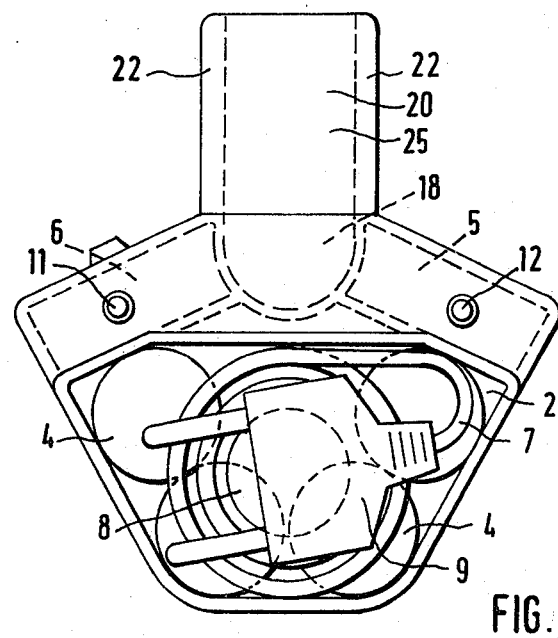
FIG. 4 shows the housing after removal of the solar cells and removal of the top cover for the battery compartment.
Figure 6:
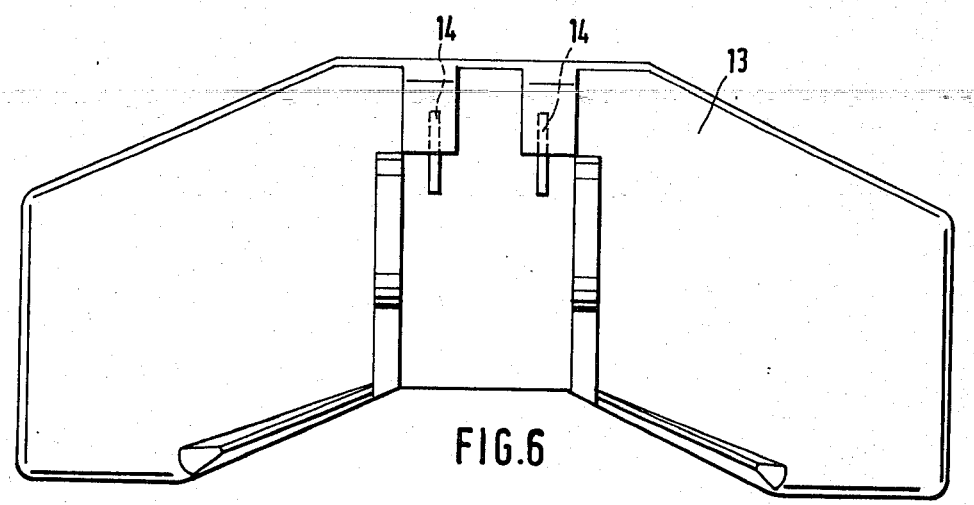
FIG. 6 is a bottom view of the solar cell sub-assembly, removed from the housing of the battery unit.

The housing unit 1 defines a forwardly positioned battery chamber 2 (FIG. 4) which is closed off on top by a top cover 3 (FIG. 3). The battery chamber 2 retains a plurality of rechargeable battery units 4. The battery chamber 2 additionally has two lateral side spaces 5,6 (FIG. 4) in which space is provided to place a power line recharging unit and to locate electronic switching elements, such as a diode. For example, space 5 may be used for a power line adapter-and-recharger to recharge the battery cells 4 from a power line network, and space 5 to provide room for electronic components assuring automatic switch-over between electrical connection of a head light 41' (FIG. 2) and a tail light 43' to either the battery unit 4 or to a generator 42' which is driven by frictional engagement with the side wall of one of the bicycle tires, and thus provides output voltage at a varying level only during operation of the bicycle. The circuitry is well known and does not form part of the present invention; the housing unit 1 provides space for the respective circuit elements. The power line recharging unit, in space 6, can be connected to the power line by a connection cable 7 which is wrapped around a cylindrical wrapping mandrel or wrapping form 8 positioned in the battery chamber 2. The power cable terminates in a flat plug for connection to a standard power outlet. Cable 7 and plug 9 are likewise positioned in the battery chamber 2, and preferably in the upper portion thereof.

Figure 1:
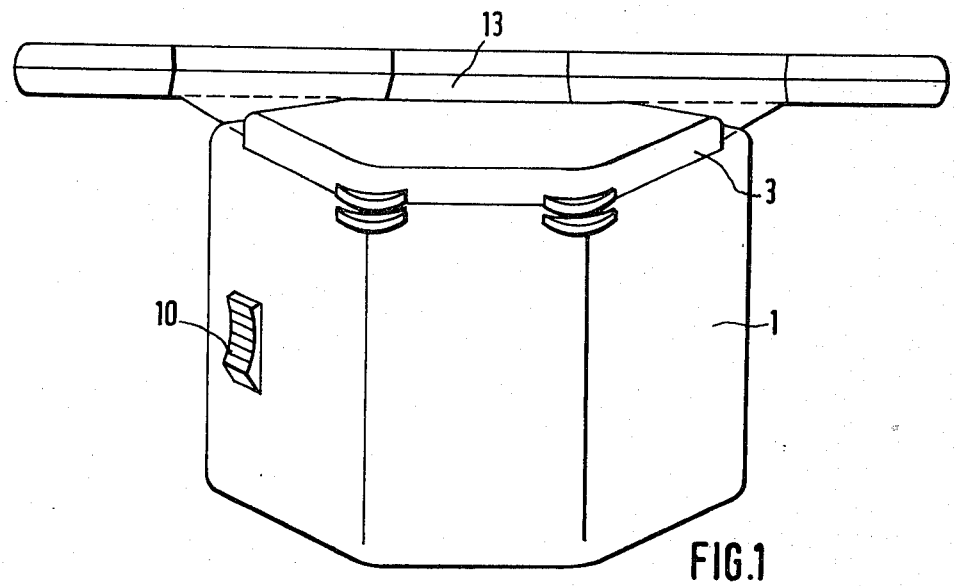
FIG. 1 is a front perspective view of the battery unit showing the housing, and the transfer switch and its position, in relation to handle bars of a bicycle.

A transfer switch 10 is positioned laterally and forwardly on the housing—see FIG. 1—to permit manual switch-over of the head light and tail light, respectively, or both, between either full battery operation, combined operation, or solely generator operation. Upon disengagement of the generator from contact with a wheel of the bicycle—as well known—the switch will then effectively also be in an OFF mode. Two monitoring lamps 11, 12 are located so as to be visible from the top side of the unit. Monitoring lamp 11 is used to supervise the charge condition of the battery 4; monitoring lamp 12 is used to supervise proper operation of the electrical system of the bicycle, and specifically to monitor proper operation of the tail light and, if desired, also of the head light.

The housing is arranged to permit association of a solar cell generator 13 therewith. The housing is formed with openings 15 (FIG. 2), engaged by pin 14 projecting from the solar cell generator 13 and, simultaneously, forming electrical and mechanical connections. The number of solar cells 16 on the solar cell generator 13 is determined by the area available and can be selected as desired.

Figure 5:
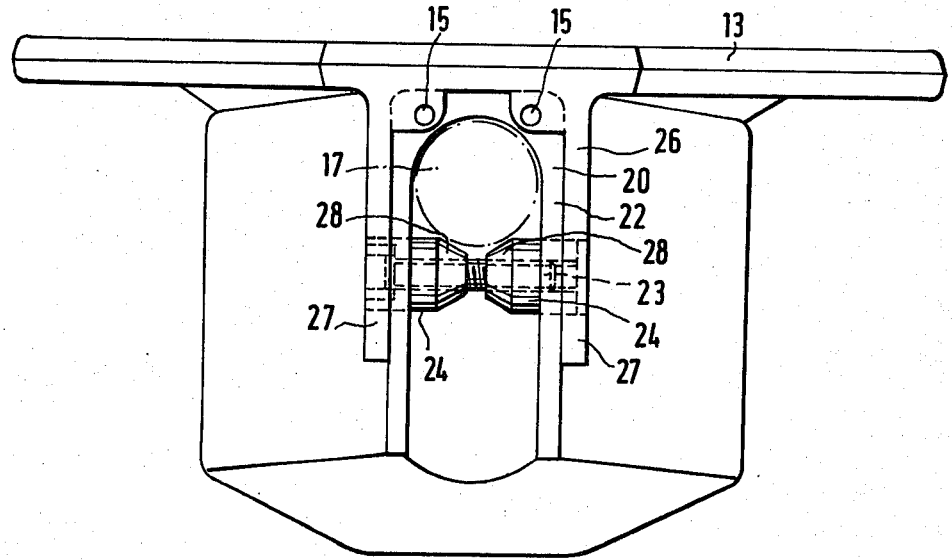
FIG. 5 is a rear view of the housing.

In accordance with a feature of the invention, the housing retaining the battery cell 4 is so arranged that it can be releasably attached to the handle bar post or stem and/or the handle bar bracket of a bicycle—see FIG. 2. The handle bar post or stem 17 is shown schematically—omitting any clamping screws and, likewise, the handle bar connecting stem 17 is shown only schematically. To permit ready assembly and disassembly of the battery unit from the bicycle, the rear wall of the housing 1 is formed with a recess 18 (FIG. 2) which is shaped such that the downwardly directed post portion 19 of the handle bar assembly 17–21 can fit snugly therein. A flap or disk-like extension 20 on the rear wall of the housing 1 continues beyond the recess 18. The extension 20 surrounds not only the portion 19 of the handle bar assembly 17–21, but also the usually essentially horizontal portion 21 thereof. Frequently, the horizontal portion 21 is of different diameter than the depending portion 19. The extensions 20 are essentially rigid and are formed with bores therethrough at a position behind the junction of the depending portion 19 and the horizontal portion 21 of the handle bar assembly. The bores 27 (FIG. 2) are provided to permit passage of attachment bushings 24 having inwardly facing conical ends 28 (FIG. 5), and fitting within the openings 27, that is, within the zones 22 of the extensions 20 surrounding the opening. The bushings 24 can be drawn together by a screw 23, or the like, such that the conical ends 28 will engage from both sides against the depending portion 19 and, preferably, also against the horizontal portion 21 of the handle bar assembly 17–21 (see FIGS. 2 and 5), so that the housing unit 1 is held rigidly and snugly in position by engagement of the conical surfaces of the bushing 28 in the angle formed by the handle bar elements 19 and 21. C-rings or other resilient snap rings can be provided to prevent complete loss of the bushings 24 when the screw 23 is withdrawn.

The housing unit 1 can be attached differently to the bicycle. For example, it could be attached to the bicycle on the lower vertical post in the region of the front-wheel brake. Further, a support strut unit, similar to that used with a forward or front-wheel luggage carrier, can be assembled to the housing to secure it in position.

Housing units of this type can then be constructed to retain a larger number of battery cells and, possibly, to also support a larger solar generator. Yet, the housing unit, being attached to the forward part of the bicycle, is within the field of vision of the operator, the control lamps are within the field of vision of the operator, and the transfer switch 10 is readily accessible and can be operated without interfering with steering and guiding of the bicycle.

The housing 1 with battery 4 can be removed from the bicycle, for example to recharge the battery. If it is desired to use the bicycle in the meanwhile, with illumination, a connecting coupling 31 can be used forming a connector or bridge between the wires and lines 41, 42, 43 extending between the head light 41', the generator 42', and the tail light 43', respectively, to the battery unit 1. These wires are preferably brought together in a plug unit 40 (FIG. 2). The plug unit 40 can be plugged into the power unit 1; to make use of the generator without the battery unit, the connecting coupling 31 (FIGS. 7 to 9) can be used. Connecting coupling 31 forms a current bridge between the generator 42' and the illuminating units 41', 43'. Connector 31 is an element, for example made of plastic, with an opening 35 into which the plug 40 can fit. The opening 35 is formed in a projection 34, the other end of which terminates in two wing-like extensions 32 defining therebetween a part-circular opening 33 which can be snapped about the depending portion 19 of the handle bar holding assembly 17–21. The wing portions 32 are resilient, can be spread slightly apart and snapped over the stem 19, to then resiliently clamp thereabout. The plug 40 preferably is a flat three-terminal plug, for example polarized, and the unit 31, functioning as an adapter contains internal wiring bridges to form bridging connections between the connecting line 42 from the generator 42' and the light cables 41, 43.

The unit has the substantial advantage that no modification of existing electrical equipment on the bicycle is needed while permitting additional operation with rechargeable batteries when continuous illumination, for example as required for traffic safety, both, and probably more importantly, by a rear or tail light, is required under all operating conditions, that is, regardless of whether the bicycle is moving or stopped.

The solar generator 13 is not strictly necessary and, preferably, is so arranged that it can be fitted on the housing unit and be supported thereby. Preferably, the solar generator 13 is formed with depending wings 26 which are formed with openings similar to opening 27 so that the wings 26 and the extensions 20 of the housing can be clamped conjointly by the bolt 23 (see FIG. 5). The extensions 20 from the housing have upper flat portions in order to support the solar generator unit 13 (see FIG. 2).

For some units, particularly those having a substantial number of battery cells to provide brilliant head light illumination, it may be necessary to support the unit additionally by struts secured to the front fork of the bicycle. FIG. 7, shows attachment of such struts 29 to the housing. Preferably, the housing is retained within a support shell 30—shown in FIG. 7—and essentially surrounding the housing so that the housing is cradled therein, the support cell 30 being, in turn, secured to the struts 29. The attachment screw can pass into the housing.

I claim:

1. For attachment to a bicycle having a generator (42) and electrical illuminating means (41, 43), a selectively removable re-chargeable battery unit (4), having
   a transfer switch (10) for selective connection of the illuminating means to the generator (42) or to the battery unit (4);
   a housing (1);
   means to attach the housing on the frame of the bicycle in a predetermined position, said housing having a wall (3) which, upon such attachment, becomes a top wall,
   wherein
   the housing (1) is a unitary element and defines a battery chamber (2);
   the battery (4) is retained in the chamber in the housing;
   the transfer switch (10) is secured to the housing and externally accessible therefrom;
   a battery-charge indicator (11) is provided, connectable to said battery and providing an indication of the charge state thereof;
   and a lamp circuit indicator (12) is provided, connected to the illuminating means and providing an indication of proper functioning thereof,
   said indicators (11, 12) being arranged on the housing to be visible by the user when looking towards said top wall, whereby the releasable attachable housing forms a unitary support for the indicators;
   and the attachment means comprise
   means for attachment of the housing engageable with the handle bar post or stem (17) of the bicycle.

2. Unit according to claim 1, further including a power recharging unit (6) for the battery (4) positioned within the housing.

3. Unit according to claim 1, wherein said indicators comprise monitoring lights (11, 12) located on the top wall of the housing.

4. Unit according to claim 1, further including a connector (14) for a solar generator cell unit (13) formed on the housing.

5. Unit according to claim 4, wherein the solar generator cell unit comprises connector means (15) engageable with the connector in the housing.

6. Unit according to claim 1, wherein the attachment means comprise releasable attachment wings (20) projecting from the housing.

7. Unit according to claim 6, wherein the wings (20) define therebetween a groove or recess (18) dimensioned to fit around the upwardly extending portion (19) of the handle bar post, said wings being essentially rigid.

8. Unit according to claim 7, further comprising transverse bores (27) formed in the wings;
   and clamping bolt means (23, 24, 28) having conical portions fitting around the vertically extending portion (19) of the handle bar support post to clamp the wings (20), and hence the housing, on the handle bar support.

9. Unit according to claim 5, wherein the attachment means comprise rearwardly projecting attachment wings (20) formed on the housing and shaped to fit around the vertically extending portion (19) of the handle bar support post or stem (17);
   and the solar generator (13) is positionable on the housing for engagement and support by said wings (20).

10. Unit according to claim 9, wherein the connector means on the solar generator and the housing, respectively, extend in essentially horizontal direction for sliding engagement movement of the solar generator (13) with respect to the housing (1) while fitting over said wings.

11. Unit according to claim 10, further including attachment wings (26) projecting from the solar generator and extending essentially parallel to said wings (20) secured to the housing, said attachment wings being formed with an opening for conjoint attachment of said solar generator and said housing to the vertically extending portion of the handle bar support post (17).

12. Unit according to claim 6, wherein the attachment means comprises rearwardly extending portions (20) having a gap therebetween to fit about the forward vertical support post of a bicycle in the region of the front-wheel brake thereof.

13. Unit according to claim 12, further including additional attachment means (29) in the form of struts to secure the housing to the front wheel fork of the bicycle.

14. Unit according to claim 13, further comprising a cage-like shell (30) shaped to fit around the housing unit, and attachable to said struts (29) to retain said housing in said shell.

15. Unit according to claim 1, wherein the housing is formed with a recess (34) to receive a connecting plug (40) for electrical connection to said generator and to the illuminating means;
    in combination with a socket element (31) having resilient snap connecting wings (32) fitting around the depending portion (19) of the handle bar post (17) and being formed with contacts adapted to receive said connecting plug in the absence of assembly of said battery unit on the bicycle.

16. Unit according to claim 1, wherein the housing is formed with a recess to receive a connecting plug (40) having connections (41, 42, 43) to the generator (42) and to the head light (41') and the tail light (43').

* * * * *